(12) United States Patent
Gunnarsson et al.

(10) Patent No.: US 8,265,033 B2
(45) Date of Patent: Sep. 11, 2012

(54) CLOSED SUBSCRIBER GROUP CELL HANDOVER

(75) Inventors: Fredrik Gunnarsson, Linköping (SE); Pål Frenger, Linköping (SE); Johan Moe, Mantorp (SE)

(73) Assignee: Telefonakatiebolaget LM Ericsson (publ), Stockholm (SE)

( * ) Notice: Subject to any disclaimer, the term of this patent is extended or adjusted under 35 U.S.C. 154(b) by 1092 days.

(21) Appl. No.: 12/153,797

(22) Filed: May 23, 2008

(65) Prior Publication Data

US 2009/0047960 A1 Feb. 19, 2009

Related U.S. Application Data

(60) Provisional application No. 60/955,510, filed on Aug. 13, 2007, provisional application No. 60/960,855, filed on Oct. 17, 2007.

(51) Int. Cl.
*H04W 24/00* (2009.01)
(52) U.S. Cl. ................ 370/331; 455/456.1
(58) Field of Classification Search ............... 455/41.2, 455/63.1, 67.11, 404.1, 410, 411, 414.2, 455/422.1, 424, 435.1, 435.3, 456.1; 370/252, 370/259, 328, 331, 338, 350
See application file for complete search history.

(56) References Cited

U.S. PATENT DOCUMENTS

| 5,640,677 | A | * | 6/1997 | Karlsson | 455/434 |
| 6,233,222 | B1 | * | 5/2001 | Wallentin | 370/229 |
| 6,295,450 | B1 | * | 9/2001 | Lyer et al. | 455/436 |
| 6,466,790 | B2 | * | 10/2002 | Haumont et al. | 455/437 |
| 6,487,409 | B2 | * | 11/2002 | Qing-An | 455/436 |
| 6,560,455 | B2 | * | 5/2003 | Amin et al. | 455/432.3 |
| 6,792,283 | B1 | * | 9/2004 | Roberts et al. | 455/525 |
| 6,889,040 | B1 | * | 5/2005 | Koo et al. | 455/418 |
| 7,072,663 | B2 | * | 7/2006 | Ramos et al. | 455/453 |

(Continued)

FOREIGN PATENT DOCUMENTS

WO  WO 2005/115042  1/2005

(Continued)

OTHER PUBLICATIONS

"Active Mode Mobility Restriction for Home eNB", Ericsson, Aug. 20-24, 2007.

(Continued)

*Primary Examiner* — Michael Thier
*Assistant Examiner* — Prince A Mensah
(74) *Attorney, Agent, or Firm* — Nixon & Vanderhye P.C.

(57) ABSTRACT

A radio terminal connection may be handed over from a serving base station associated with a serving cell to a closed subscriber group (CSG) cell served by a CSG base station in which only radio terminals belonging to the CSG are permitted to access and receive service from the CSG cell. Radio terminals in the serving cell are generally informed not to report to the serving base station signal quality measurements of signals transmitted by CSG base stations. But if a radio terminal in the serving cell is authorized to access and receive service from the CSG cell, then that radio terminal is instructed to report to the serving base station signal quality measurements of signals transmitted by the CSG base station. Based on that report, the connection may be handed over to the CSG base station. A central node provides a CSG authorization list identifying CSG authorized radio terminals to the serving base station when a listed CSG cell is a neighboring cell which the radio terminal is authorized to access.

30 Claims, 8 Drawing Sheets

U.S. PATENT DOCUMENTS

| | | | |
|---|---|---|---|
| 2002/0151304 A1* | 10/2002 | Hogan | 455/436 |
| 2003/0013443 A1* | 1/2003 | Willars et al. | 455/432 |
| 2004/0023634 A1* | 2/2004 | Jeong et al. | 455/403 |
| 2004/0157600 A1* | 8/2004 | Stumpert et al. | 455/432.1 |
| 2005/0272425 A1* | 12/2005 | Amerga et al. | 455/436 |
| 2007/0183427 A1 | 8/2007 | Nylander et al. | |
| 2007/0202866 A1 | 8/2007 | Tsuchiya | |
| 2007/0281696 A1 | 12/2007 | Vikberg et al. | |
| 2007/0293222 A1 | 12/2007 | Vikberg et al. | |
| 2008/0051088 A1 | 2/2008 | Tariq et al. | |
| 2008/0220782 A1* | 9/2008 | Wang et al. | 455/436 |
| 2008/0267114 A1* | 10/2008 | Mukherjee et al. | 370/315 |
| 2008/0267153 A1* | 10/2008 | Mukherjee et al. | 370/338 |
| 2009/0042596 A1 | 2/2009 | Yavuz et al. | |
| 2009/0061937 A1 | 3/2009 | Rajasimman et al. | |

FOREIGN PATENT DOCUMENTS

| | | |
|---|---|---|
| WO | PCT/EP2007/001737 | 2/2007 |
| WO | WO 2007/040454 | 12/2007 |

OTHER PUBLICATIONS

3GPP TS 36.300 v. 8.4.0, Release 8, Mar. 2008; AN-XP014041816; pp. 1-126.

International Preliminary Report mailed Feb. 25, 2010 in International Application No. PCT/SE2008/050909.

3GPP TSG GERAN #37bis; Tdoc G2-080134; Alternatives for E-UTRAN Neighbour Cell Unformation; Sophia-Antipolis, France, Mar. 31-Apr. 3, 2008.

3GPP TSG-GERAN WG2 Meeting #37bix; Tdoc G2-080231; LS on E-UTRAN Neighbour Cell List Information for Geran; Sophia-Antipolis, France, Mar. 31-Apr. 3, 2008.

3 GPP TSG GERAN #38; Tdoc GP-080668; Measurement Reporting for GERAN / E-UTRAN Inter-working; Malaga, Spain, May 12-16, 2008.

U.S. Appl. No. 12/143,504, filed Jun. 20, 2008; Inventor: Gunnarsson et al.

Office Action mailed Jul. 14, 2011 in co-pending U.S. Appl. No. 12/143,504.

International Search Report of the International Search Searching mailed Dec. 23, 2008 in corresponding PCT Application PCT/SE2008/050860.

Written Opinion of the International Search Searching mailed Dec. 23, 2008 in corresponding PCT Application PCT/SE2008/050860.

English Summary of Japanese official action, Mar. 19, 2012, in Japanese Application No. 2010-520966.

3GPP TSG RAN WG2 Meeting #58bis; LS on Closed Subscriber Groups for LTE Home Cells, Release 8, Jun. 25-29, 2007, R2-072991.

3GPP TSG RAN WG1 Meeting #50, "Cell ID Assignment for Home Node B", Aug. 20-24, 2007, R1-073684.

* cited by examiner

CLOSED SUBSCRIBER GROUP CELL HANDOVER

PRIORITY APPLICATIONS

Priority is claimed from U.S. provisional patent applications Ser. Nos. 60/955,510, filed on Aug. 3, 2007, and 60/960,855, filed on Oct. 17, 2007, the disclosures of which are incorporated herein by reference.

TECHNICAL FIELD

The technical field relates to radio communications, and in particular, to radio communications that involve closed subscriber group radio base stations.

BACKGROUND

In a typical radio communications system, radio communications terminals referred to as radio terminals or user equipment terminals UEs communicate via a radio access network (RAN) with other networks like the Internet. The radio access network (RAN) covers a geographical area which is divided into cells, with each cell being served by a base station, e.g., a radio base station (RBS), which in some networks is also called a "NodeB" or an enhanced Node B "eNodeB." Each base station typically serves several cells. One common deployment is 3-cell base station installations, where a base station serves three cells. A radio terminal is primarily served by a serving base station in a serving cell in which the radio terminal resides. In some technologies, communication links are not only established between a particular radio terminal and its serving cell, but also between the radio terminal and other cells. In this case, the terminal is served by multiple base stations using what is referred to as macro diversity or soft handover.

A base station sends signals to and receives signals from radio terminals. The signals may either be dedicated signals to and from specific radio terminals, multicast signals intended for a subset of the radio terminals in a cell, or broadcast signals from the base station to all radio terminals in a cell. A base station broadcasts information to all the radio terminals in a cell using the broadcast channel of the serving cell.

Small scale base stations have recently been introduced that are connected to broadband internet service and provide coverage for very small areas sometimes called femto cells. Femto cells are similar to WiFi "hotspots" but are part of a cellular network rather than a wireless local area network (WLAN). The femto base stations work in many ways like a larger "macro" base station would, but on a much smaller scale with low output power designed for small spaces such as apartments, houses, offices, etc. Pico is another name for these small base stations meaning "small," and in this case, "femto" means even smaller. Femto base stations provide a better signal in smaller interior or closed spaces where signal quality between regular macro base stations and mobile phones is poor due to the proximity of macro base station towers or just due to the material of the building or other obstructions blocking the signal. Instead of using a traditional base station for access, the mobile terminal gains access through the femto base station to gain access to the IP access network.

FIG. 1 shows an example of a cellular communications system that includes a small scale base station and a traditional macro base station. A first building 1 includes a radio terminal 2 that receives radio signals from a macro base station 3. The macro base station 3 is coupled to a core network 5 either directly or through a radio access network 4. The core network 5 provides access to the Internet 6 and other networks. A second building 7 includes another radio terminal 8 that receives radio signals from a small scale base station 9. The small scale base station 9 may be coupled, typically via some broadband access mechanism (wired or wireless), to the core network 5 either directly or through a radio access network 4. Again, the core network 5 provides access to the Internet 6 and other networks. Because the small scale base station is located inside the building 7 and is typically only intended to provide coverage within and in close proximity to the building 7, its transmit power can be considerably lower than that of the macro base station 3, which has a much larger and varied coverage area, while still providing high data rate service.

Small scale base stations usually serve small cell areas that have a restricted group of users such that only users in that group can receive service from the small scale base station. Often, a customer may buy a small scale base station in a retail store and install it by connecting it to a power outlet and the data network in a home, office, school, etc. These small scale base stations are sometimes called home base stations, femto base stations, pico base stations, etc. A larger scale macro base station may also only allow access and provides service to a restricted group of users, but a small scale base station is the more typical example. For this application, any base station that only allows access and provide service to a restricted group of users is referred to as a closed subscriber group (CSG) base station. A CSG base station serves one or several CSG cells which only permit access to a restricted set of radio terminals. A CSG cell may also be used to compile networks with restricted access, e.g., to support corporate networks. A base station that is not so closed or restricted in this way is referred to as an "open" base station.

Current cellular radio systems include for example Third Generation (3G) Universal Mobile Telecommunications System (UMTS) operating using Wideband Code Division Multiple Access (WCDMA) and Fourth generation (4G) systems, like the Long Term Evolution (LTE) of UMTS operating using Orthogonal Frequency Division Multiple Access (OFDMA). One important focus area in the LTE and System Architecture Evolution (SAE) standardization work is to ensure that the new network is simple to deploy and cost efficient to operate. The vision is that the new system will be self-optimizing and self-configuring in as many aspects as possible. One such aspect is automatic incorporation and handling of closed subscriber group cells (CSG cells) on the same frequency band as the traditional macro cell layer with essentially no configuration.

A CSG base station installation may be motivated by various expectations and presents various issues. For example, an end-user connected to his/her CSG base station hopes to achieve a higher price/performance ratio as compared to the macro network while still receiving the same services as when connected to a macro base station. The user may also expect higher data rates and better service quality than when camping on a macro cell. Another expectation is easy and essentially automatic installation procedure of the CSG base station which includes support of handovers to/from the CSG base station for authorized users without extensive manual configuration. One issue arises from a CSG base station possibly having lower call management capabilities than a macro base station and therefore may be less proficient at performing admission and authorization functions. If so, many non-authorized handover requests to the CSG base station, and subsequent handover rejections in response thereto, will hamper the performance of the CSG base station. Another issue is the desirability of convenient addition of new users who are authorized to use the CSG base station. Furthermore, it is beneficial if operators can sell a CSG base station where all users with a particular subscription with the same operator are authorized to use any, or a subset, of the CSG base stations.

Handovers in LTE and WCDMA are mobile-assisted, which means that the radio terminal reports to its serving base station measurements the radio terminal has made of the quality (e.g., signal strength) of signals received from the serving base station and from other cell alternatives associated with handover "candidate" base stations. The other cell alternatives are identified using cell identifiers. Non-limiting examples of such physical identifiers are the downlink scrambling code number of the cell in WCDMA and the physical cell identifier in LTE describing a reference signal waveform of the cell. This means that the radio terminal may either report another cell also served by the same base station (assuming the base station serves multiple cells) or another cell served by a different base station.

A neighbor cell relation list is a list associated to a cell listing relevant (e.g., neighboring) candidate cells for handover. For each candidate cell, the list information includes: cell identifiers including both physical cell identities and globally-unique cell identities, connectivity information, e.g., how a communication link can be established between the serving base station and the base station serving the candidate cell, and cell type information, e.g., CSG cell, macro cell, micro cell, etc. The neighbor cell relation list may be stored in the base station, but it may also be stored in other nodes, possibly with regular updating/synchronization of the lists in each node.

A radio terminal's measurement report transmission is typically triggered, i.e., event-triggered, event-triggered periodic, or periodic. For event-triggered reporting, the radio terminal sends a report to its serving base station when a configured criterion is met. One example of such a criterion is that the quality of a new cell is measured during a predefined time within a range between the serving cell and a predetermined offset. The predetermined time and offset are provided by the serving base station to the radio terminal. Another example of such a criterion is that a cell that previously was within a range between the serving cell and a predefined offset moves outside the range for a predefined time. Event-triggered reporting results in one measurement report upon triggering of an event. For event-triggered periodic reporting, the radio terminal continues to send measurement reports periodically after triggering of an event—either for a predefined number of periods, or until a different triggering condition is met. For periodic reporting, the radio terminal regularly reports measurements. This was typically the case for second generation systems such as GSM.

The radio terminal typically considers all cells when investigating whether a triggering event is met. On the other hand, it is preferred that the radio terminal does not consider and report alternative cells that are somehow indicated as forbidden for access. One way to communicate the forbidden status of various cells is for the serving base station to broadcast a black-list of cells on the serving cell's broadcast channel (i.e., the serving cell broadcasts a black list of cell identifiers). Another way is for the radio terminal to only report cells included in a "white" list broadcast by the serving base station on the serving cell's broadcast channel. The white list can be seen as an inverse black list. If there are many cells on the black list, it may be more efficient to signal the white list or vice versa. A third way is for each base station serving a prohibited cell to broadcast a message over the broadcast channel of the prohibited cell that indicates that the prohibited cell is forbidden for access, and that all radio terminals need to check this indication before reporting a cell. Examples of such indicators are "Cell Barred," "Cell Restricted," or "CSG Cell."

Similarly, there is the possibility of a significant unnecessary signaling processing load for CSG base station. If a CSG base station is deployed as a typical "open" base station, then the CSG base station will have to handle many handover requests for non-authorized radio terminals that are not part of the CSG, and as a result, must also reject these requests. This generates a significant and unnecessary processing load for the CSG base station.

An alternative is to assign a dedicated Public Land Mobile Network (PLMN) identity to the CSG cell—PLMN identity that is different from the PLMN identity of the macro cells. Then radio terminals with access to the CSG cell have both CSG cell and macro cell PLMN identities listed among the set of allowed PLMNs, while other radio terminals only have the PLMN identity of the macro cells listed. As a result, only radio terminals with access to the CSG cell can roam to that cell. Because it is not feasible to assign unique PLMN identities to each CSC cell, one approach is to assign the same PLMN identifier to all CSG cells. This means that if a radio terminal has access to one CSG cell, then it has access to all other CSG cells associated with the same operator as well. But this approach does not support a CSG cell with a more restricted set of users, such as all members of a family or all employees at a company.

In areas with many CSG cells, radio terminals may have to consider multiple CSG cell alternatives along with the possibility that other CSG cell may be better candidates than the radio terminal's "own" CSG cell, i.e., the CSG specifically implemented to serve that radio terminal and other radio terminals included in that CSG. In that case, the radio terminal's own CSG cell might not even be listed in the signal quality measurements report from the radio terminal, which defeats the main purpose of establishing the CSG including the radio terminal.

SUMMARY

A radio terminal connection may be handed over from a serving base station to a closed subscriber group (CSG) cell served by a CSG base station in which only radio terminals belonging to the CSG are permitted to access and receive service from the CSG cell. Radio terminals in the serving cell are informed not to report to the serving base station signal quality measurements of signals transmitted by CSG base stations in general. If a radio terminal in the serving cell is determined to be authorized to access and receive service from the CSG cell, the serving base station sends a message instructing the radio terminal to also consider the CSG cell when evaluating report triggering of signal quality measurement reports of candidate cells to the serving base station. Upon report triggering of the CSG cell, (the radio terminal determines that the CSG cell is a handover candidate), a signal quality measurement report for the CSG cell is received by the serving base station from the one radio terminal. Based on the received and possibly subsequent reports, a decision may be made that a connection with the one radio terminal may be handed over to the CSG base station. Since unauthorized radio terminals do not report measurements for CSG cells, the handover mechanism in the serving base station can apply the same handover mechanism to all reported cells without risking initiating a handover of a radio terminal to a cell to which the radio terminal does not have access.

In a non-limiting example, the information that instructs radio terminals not to report to the serving base station signal quality measurements of signals transmitted by the CSG base station may be broadcast in the serving cell and may include a list identifying cells for which the information is not to be reported or a list of cells identifying only those cells for which the information is to be reported. If changes are made to the list, a modified cell list may be broadcast in the serving cell.

In a non-limiting example, the radio terminal may be informed not to report to the serving base station signal quality measurements of signals transmitted by the CSG base station using a first message that indicates that the CSG cell has restricted access to a CSG. Examples of such indicators are a barred cell, a restricted cell, or a CSG cell.

In a non-limiting example, a radio terminal with access to a CSG cell, where that CSG cell has an established neighbor cell relation to the serving cell of the radio terminal, may be informed by the serving base station using a second message that the radio terminal also should include signal quality measurements of signals transmitted by the CSG base station in the measurement reports to the serving base station. For example, the second message from the serving base station may provide the radio terminal with a dedicated list identifying cells for which the information is not to be reported, that list excluding all CSG cells that the radio terminal has access to, or a list of cells identifying only those cells for which the information is to be reported including all CSG cells that the radio terminal has access to.

As another non-limiting example, the second message from the serving base station may provide the radio terminal with a list identifying CSG cells that the radio terminal must consider in event-triggered measurement reporting even though these listed CSG cells indicate that they are forbidden for access. Alternatively, the list identifying CSG cells may be a list of cell identifiers or a range of cell identifiers.

The sending step may include sending a second subsequent message to the radio terminal indicating that the radio terminal should consider signal quality measurements of signals transmitted by the CSG base station in the event-triggered measurement reporting. The first message may be transmitted by the serving base station or by the CSG base station.

In a non-limiting example, the determining step may include receiving an authorization list of CSG cell(s) associated to the radio terminal from a central node coupled to the serving base station, which means that the radio terminal is authorized to access and obtain service from the listed CSG cell(s) and comparing the listed CSG cell(s) to the CSG cell(s) in the neighbor cell relation list of the serving cell.

In another non-limiting example, the determining step may include a filtering step in the central node coupled to the serving base station. The central node sends a filtered authorization list of CSG cells associated to the radio terminal. The radio terminal is authorized to access and obtain service from the listed CSG cell(s). All the listed CSG cells are members of the serving cell's neighbor cell list.

In a non-limiting example, the filtering step may include sending the neighbor cell relation list of the serving cell and the one radio terminal identity to the central node, comparing the radio terminal identities in the authorization lists of all CSG cells in the serving cell neighbor cell relation list with the one radio terminal identity, and forming a list of CSG cells that the radio terminal has access to and may obtain service from.

In another non-limiting example, the filtering step may include a central node maintaining a copy of the neighbor cell relation lists of all cells served by all base stations coupled to the central node and an authorization list of radio terminals for each CSG cell. The central node receives from the serving base station one radio terminal identity comparing the radio terminal identities in the authorization lists of all CSG cells in the serving cell neighbor cell relation list with the one radio terminal identity, and based on that comparison, forms a list of CSG cells that the radio terminal have access to and obtain service from.

The CSG cell may be part of a CSG network of CSG cells to which the radio terminal is authorized to access and request service, each of the CSG network cells having an associated cell identifier. In such a case, the determining includes receiving a CSG cell identifier range from a central node coupled to the serving base station.

In a non-limiting example, the determining step may include receiving an authorization list of CSG cell(s) associated to the radio terminal from the previous serving base station, which means that the radio terminal is authorized to access and obtain service from the listed CSG cell(s). The radio terminal may then compares the listed CSG cell(s) to the CSG cell(s) in the neighbor cell relation list of the serving cell to determine if any of the authorized CSG cells are potential handover candidates. If a handover of the radio terminal's connection from a first cell served by a first base station to a second cell served by a second base station occurs, the first base station may send the authorization list of CSG cell(s) to the second target base station. In a non-limiting example, the central node may be a database with subscriber and subscription information, such as the Home Subscriber Server (HSS), and the authorization list of CSG cells may be received from the HSS when initiating contact with the network. Other subscription information database examples include a home location register (HLR), visitor location register (VLR), and gateway location register (GLR). The term HSS will be used as a representation of a subscriber and subscription information database. During subsequent handovers to other base stations, the authorization list of CSG cells is forwarded to the target base station.

A radio terminal is provided for communicating with a serving base station serving a cell, where the radio terminal belongs to a closed subscriber group (CSG) cell served by a CSG base station. Again, only radio terminals belonging to the CSG are permitted to access and receive service from the CSG cell. The radio terminal includes radio transceiving circuitry and a data processing system coupled to the radio transceiving circuitry includes electronic circuitry. The circuitry obtains a measure of quality of signals transmitted by neighboring base stations and reports the signal quality measurements to the macro base station for a possible handover operation. The terminal initially receives first information informing the radio terminal not to report to the macro base station signal quality measurements of signals transmitted by CSG base stations, and later, second information overriding the first information that informs the radio terminal to report to the macro base station signal quality measurements of signals transmitted by the CSG base station. The circuitry determines a signal quality of a signal transmitted by the CSG base station and reports the CSG base station signal quality measurement to the macro base station.

In a non-limiting example, when the radio terminal receives instructions to handover to the CSG base station, the electronic circuitry instructs the radio transceiving circuitry to establish communications with the CSG base station.

In a non-limiting example, the second information includes a range of CSG cell identifiers. The electronic circuitry measures a signal quality of a signal received by any CSG base station having a cell identifier in the range and considers those CSG base station signal quality measurements in the measurement report triggering.

In a non-limiting example, if radio terminal is unable to obtain or maintain service from a serving base station, the electronic circuitry may scan signal quality of a signal received by any nearby CSG base station and select one of those CSG base stations to provide service. An authorized CSG base station is preferably allocated a higher selection priority over an unauthorized CSG base station.

The central node includes an interface for communicating with base stations in general, including closed subscriber group (CSG) base stations and a memory for storing a CSG authorization list identifying radio terminals that are authorized to access and receive service from CSG cells. A controller in the node provides a CSG authorization lists to a base station serving a radio terminal in that base station's serving cell when the CSG authorization list includes a CSG cell that is a neighboring cell to the serving cell and which the radio terminal is authorized to access. Otherwise, the controller does not provide the CSG authorization list to the serving base station. The controller may permit modifications to the CSG authorization list. The memory may also store a neighbor cell relations (NCR) list for the serving cell and the controller uses the NCR list to determine whether the CSG cell is a neighboring cell. The controller may receive the radio terminal identity from the serving base station. The controller may also receive the NCR list from the serving base station.

In one non-limiting example implementation, the CSG cell is part of a CSG network of CSG cells to which the radio terminal is authorized to access and request service, each of the CSG network cells having an associated cell identifier. Instead of determining a list of CSG identifiers, the controller determines a CSG cell identifier range for the CSG network and provides the CSG cell identifier range to the serving base station.

In another non-limiting example implementation, the controller determines a CSG tracking area associated with one or more CSG cells that the radio terminal is authorize to access. When the central node is notified that the radio terminal has accessed the serving cell, the controller checks whether the CSG tracking area corresponds to a tracking area of the serving cell, and if so, informs the serving base station about the one or more CSG cells.

In another non-limiting example implementation, the controller determines a CSG PLMN identity associated with one or more CSG cells that the radio terminal is authorized to access. When the central node is notified that the radio terminal has accessed the macro cell, the controller checks whether the CSG PLMN identity corresponds to a compatible PLMN identity associated with the macro cell, and if so, to inform the macro base station about the one or more CSG cells.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

Figure 1:
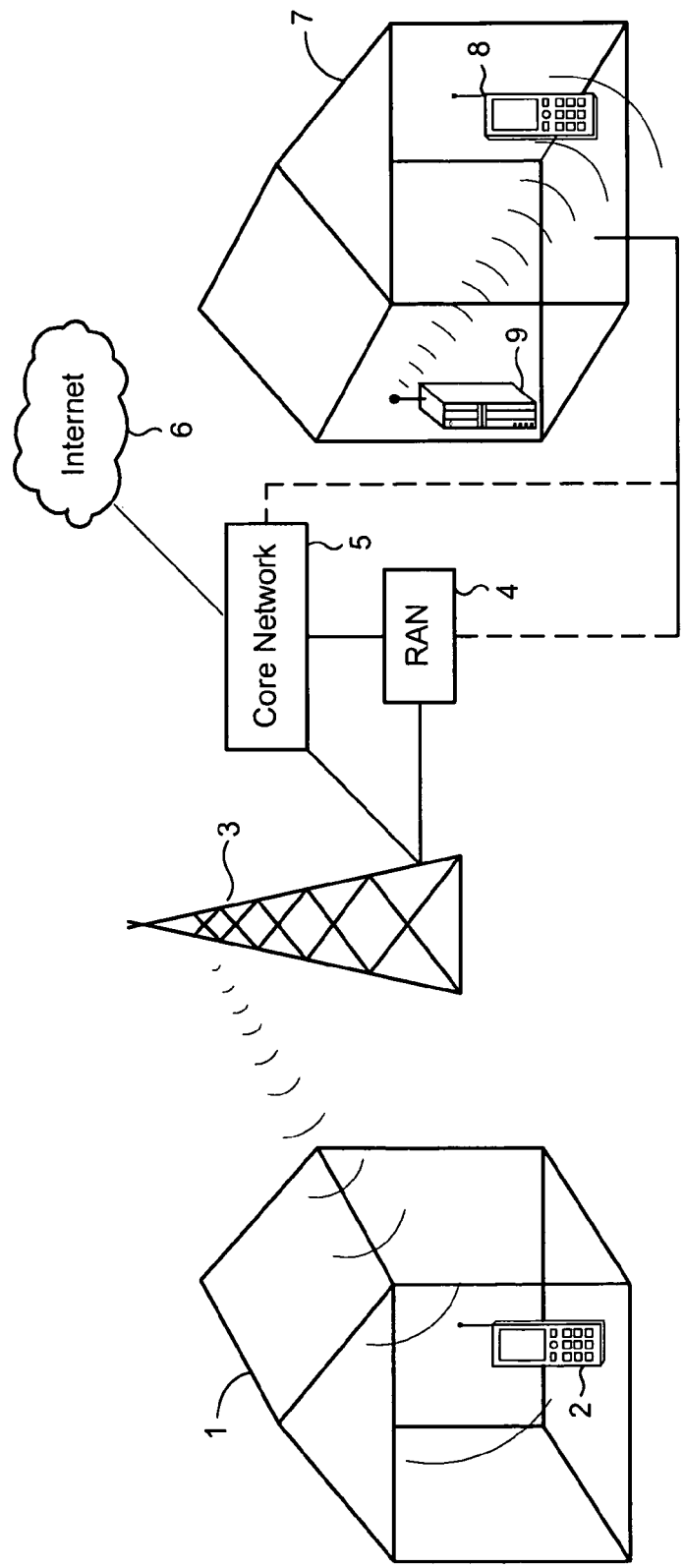
FIG. 1 illustrates a macro base station and a small scale base station in a cellular communications system.
Figure 2:
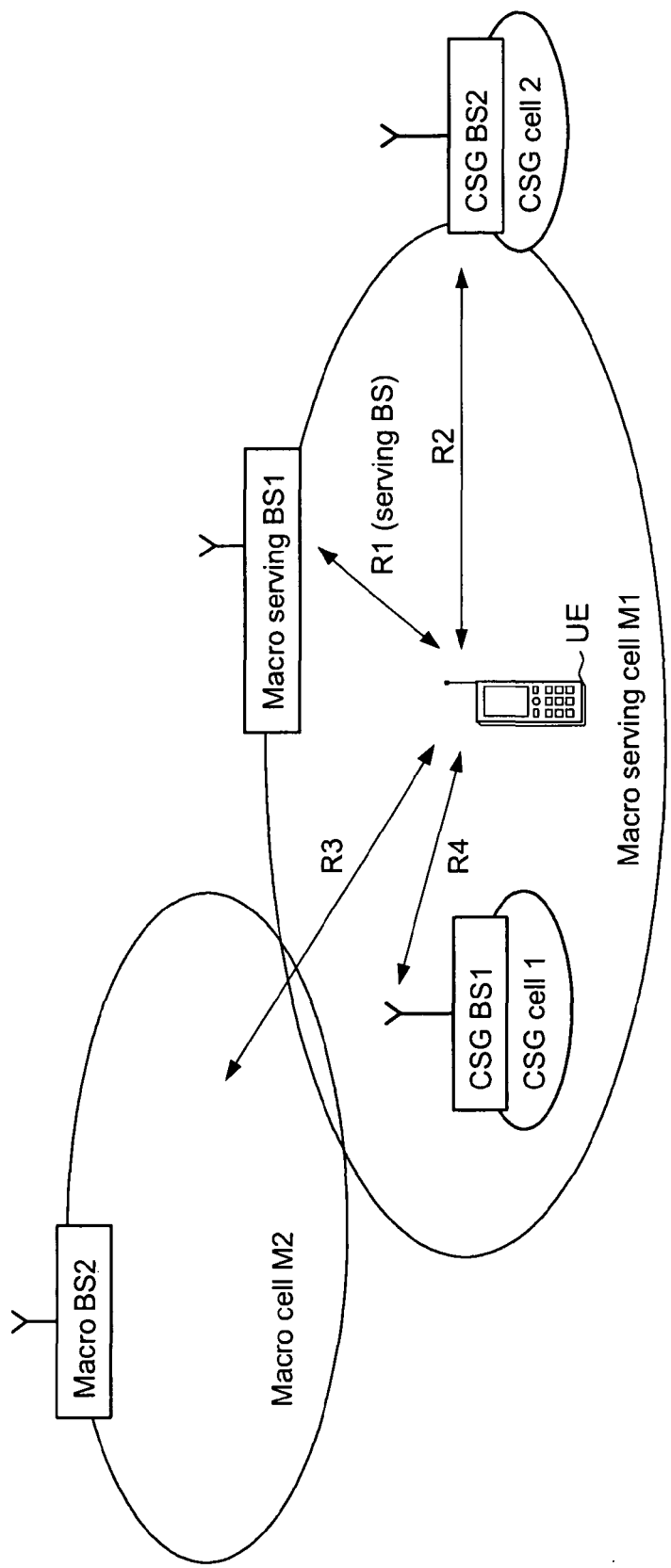
FIG. 2 illustrates a cellular communications system with macro and CSG cells and base stations.

FIG. 2 conceptually illustrates a cellular communications system with macro and CSG cells and base stations. Two adjacent macro cells M1 and M2 are shown in this simplified example with corresponding macro base stations Macro BS1 and Macro BS2. Within macro cell M1 is a CSG cell 1 with its associated CSG base station CSG BS1. Adjacent to the macro cell M1 is a second CSG cell 2 with its associated CSG base station CSG BS2. Broadcast radio signals shown as R1-R4 are shown reaching a UE/radio terminal from each of these base stations. The macro BS1 is assumed to be the base station currently serving the radio terminal, and the radio terminal has the ability to send received signal quality measurement reports to the serving base station Macro BS1 for Macro BS2, CSG BS1, and CSG BS2. If the radio terminal moves closer to CSG cell 1 or CSG cell 2, then there is an opportunity for handover to one of these CSG cells depending on whether the radio terminal is a member of the CSG for that cell.

Figure 3:
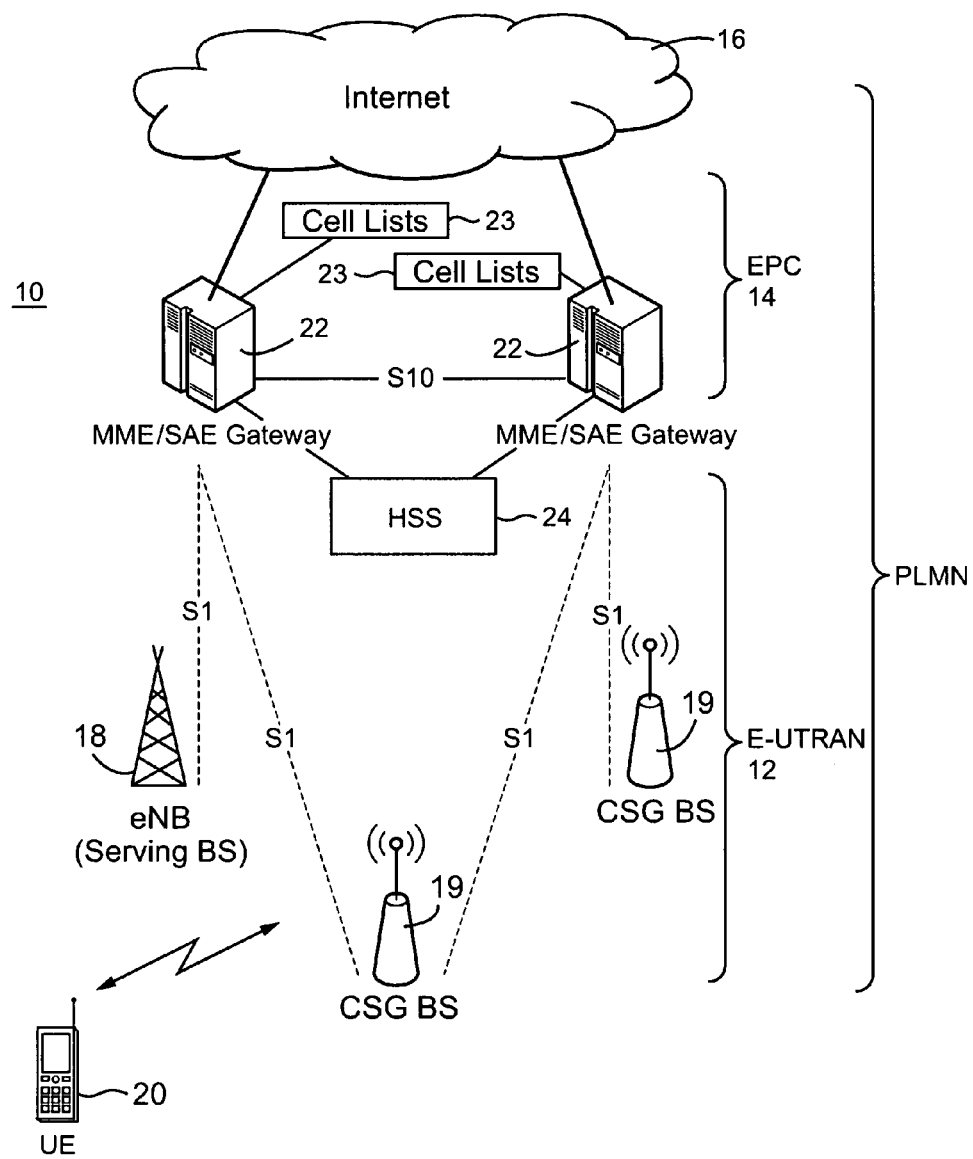
FIG. 3 is a function block diagram of an example LTE mobile radio communication system including macro and CSG base stations.

The technology in this application is well-suited for, and therefore described in the context of, an LTE system in order to provide an example and non-limiting context for explanation. But this technology may be used in any modern cellular communications system and is not limited to LTE, e.g., WCDMA, etc. FIG. 3 illustrates an example of an LTE type mobile communications system 10. An E-UTRAN 12 includes E-UTRAN NodeBs (eNodeBs) 18 (only one is shown) that provide E-UTRA user plane and control plane protocol terminations towards a user equipment (UE) terminal 20 over a radio interface. Also shown are two CSG base stations 19. The base stations 18 and 19 are communicate via an SI interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. But the MME and SAE may be separate nodes. The MME/SAE gateways may communicate via an S10 interface. The MME/SAE may include a memory 23 for storing cells lists for the base stations including for example neighbor cell relation (NCR) lists, black and/or white cell lists, etc. The E-UTRAN 12 and EPC 14 together form a Public Land Mobile Network (PLMN). The MMEs/SAE Gateways 22 are connected to directly or indirectly to the Internet 16 and to other networks. The base stations 18 and 19 may communicate with the Home Subscriber Server (HSS) 24 possibly via the MME/SAE 22.

Radio networks often use non-unique physical identifiers of base stations/cells to support efficient measurement procedures as well as globally unique cell identities. For the LTE example embodiment described, it is assumed that there is a unique identifier for each cell referred to as a Cell Global Identifier (CGI) and a physical layer 1 identifier for the same cell called a Physical Cell Identity (PCI) that is not long enough to be unique for each cell in the PLMN. In LTE, a current example assumption is to have 504 unique PCI values that are composed of 168 cell group identities and 3 identities within each group. For received signal quality measurements, the radio terminals monitor received base station broadcast reference symbols to measure the base station's reference symbol received power (RSRP). These measurements are used when performing initial cell selection as well as handovers. It is thus important from each radio terminal's perspective that there is a local one-to-one mapping between the PCIs the radio terminal can detect and the CGIs. This means that when a radio terminal reports a PCI to its serving base station, the serving base station can associate the reported PCI to an entry in the serving cell neighbor cell relation list if a cell relation is established. In a WCDMA system, the PCI may correspond to a "scrambling code" where in one example there may be 512 different scrambling codes.

In the systems shown in FIGS. 2 and 3 and in other similar kinds of systems, technology is now described that reduces the resources associated with radio terminals searching for their own CSG cell and limits unnecessary CSG cell measurements and reporting unless the radio terminal is authorized. This improves the performance of the overall network. Radio terminals are supported during handover from a BS to a CSG cell while at the same time the negative impact from having all radio terminals in the network perform measurement and reporting on unauthorized CSG cells is substantially reduced.

In one non-limiting example embodiment, all CSG base stations broadcast an indicator over the CSG cell's broadcast channel that indicates that a CSG cell has restricted access to a CSG. Examples of such indicators are a barred cell, a restricted cell, or a CSG cell. The indicator implements a general rule that radio terminals should not report the signal quality of broadcast signals received from CSG cells that include such an indicator in the broadcast channel unless specific instructions are sent to the radio terminal from the serving base station instructing the radio terminal to consider signal quality measurements associated with a particular CSG cell in the measurement report triggering. In another non-limiting example embodiment, the serving base station broadcasts a "black list" over the serving cell's broadcast channel including the physical cell identities (e.g., PCIs in LTE) of all CSG cells registered as neighbor cells to the serving cell. This prevents reporting of measurements from CSG cells from unauthorized radio terminals. Other techniques for communicating a similar type of message to the radio terminal are possible.

The serving base station may send, when desired, a message to one or more radio terminals informing them that they should consider measurements related to a specific CSG cell in the measurement report triggering even though the CSG base station serving that CSG cell broadcasts an indicator over that CSG cell's broadcast channel that indicates that a CSG cell has restricted access to a CSG or the CSG cell is identified on a "black list" broadcast by the serving base station over the serving cell broadcast channel or otherwise identified as a forbidden cell. Examples of such indicators are a barred cell, a restricted cell, or a CSG cell. Furthermore, a "black list" may also be signaled in a dedicated fashion to individual radio terminals.

This forbidden cell information used in black lists may be obtained by the base station when a radio terminal connects to a cell served by the base station, e.g., after a successful handover to or radio terminal registration with the cell. At that time, the serving base station checks with a central node (e.g., the MME in LTE or the SGSN in WCDMA or a subscriber and subscription information database such as HSS) whether the radio terminal is authorized to access any CSG cells that are neighbors to the macro base station. The central node signals to the serving base station a list of these neighboring CSG cells. The serving base station then sends an instruction to the radio terminal if it is authorized to access one or more CSG cells on the serving base station's neighbor cell relation (NCR) list requesting the radio terminal to consider those listed and authorized CSG cells in the measurement report triggering even though the CSG base stations serving those CSG cells broadcast an indicator over those CSG cell's broadcast channel that indicates that those CSG cell have restricted access to a CSG, or those CSG cells are identified on a "black list." The serving base station may update the black list by sending a new "black list" to the radio terminal replacing any prior black list. In this way, only authorized radio terminals consider CSG cells as a "candidate cell" in the measurement report triggering. Unauthorized radio terminals do not consider CSG cells in the measurement report triggering.

The forbidden cell information used in black lists may also be obtained by the base station from a central node such as the HSS during radio terminal registration. Then this forbidden cell information may be passed on to a next target base station during handover, e.g., using a message "container" in which information associated to the radio terminal can be transferred from one serving base station to the next target base station during handover.

Non-limiting example methods for compiling neighbor cell relation lists are described in commonly-assigned PCT application no. PCT/EP2007/001737, entitled "Self Configuring and Optimisation of Cell Neghbours in Wireless Telecommunications Networks," filed on Feb. 28, 2007, and commonly-assigned U.S. application serial no. 12/143,504, entitled "Neighbor Cell Relation List Initialization," filed on Jun. 20, 2008, the disclosures of which are incorporated herein by reference. The associative information between a CSG cell and authorized radio terminals stored in the central node may be accessed and modified via a user interface by the operator, the owner of the CSG cell, etc.

The serving base station preferably processes radio terminal measurement reports and conducts handover procedures independent of whether they pertain to a CSG cell or another macro cell. But handover procedures tailored to the type of target cell, e.g. a CSG cell, cell may be used.

When the radio terminal performs cell selection without macro cell coverage, the radio terminal may—contrary to the general rule when there is macro cell coverage—consider as cell connection candidates restricted, forbidden, or black-listed cells. The radio terminal may also keep track of its own CSG cell identifier value (e.g., PCI) to first try to connect with its own CSG cell. Then if that fails, the radio terminal tries to connect to other CSG cells it can detect, since other CSG cells may be authorized that the radio terminal is unaware of. In the LTE context, the current Non-Access Stratum (NAS) protocol between a core network node and the radio terminal, may be extended to inform the radio terminal about the current PCI values of the CSG cells it is authorized to connect to. Another example alternative is to send a short message service (SMS) or a multimedia message service (MMS) message or similar to the radio terminal containing this information.

Figure 4:
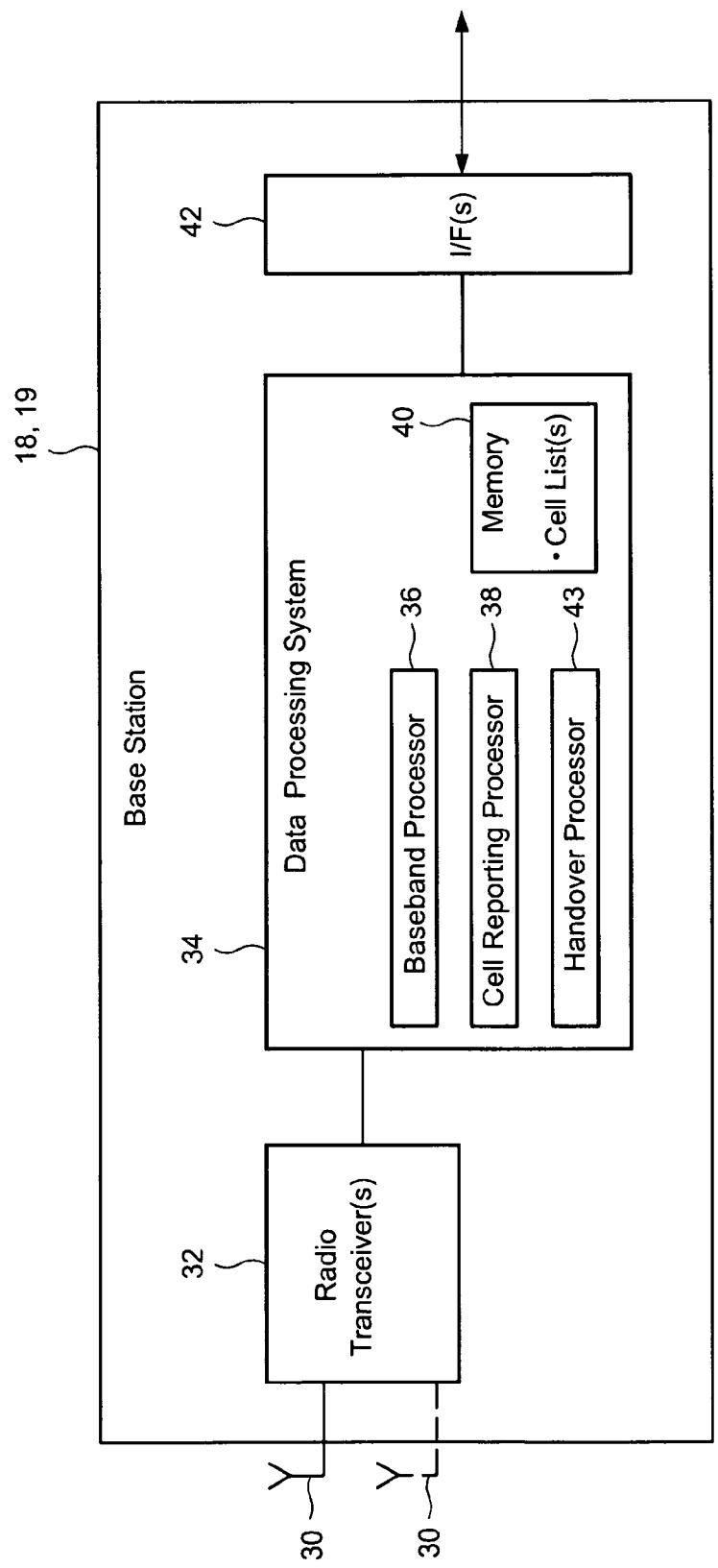
FIG. 4 is a non-limiting, example function block diagram of a base station.

FIG. 4 is a non-limiting, example function block diagram of a base station which may be either an open base station 18 or a CSG base station 19. The base station 18, 19 includes one or more radio transceivers 32 coupled to one or more antennas 30 for communicating over the radio interface with radio terminals. The radio transceiver(s) 32 connect to a data processing system 34 which includes a baseband processor 36 that performs baseband processing on the information to be transmitted via the radio transceiver(s) 32 and on signals received from the radio transceiver(s) 32. The data processing system 34 also includes a cell reporting processor 38 which receives from the transceiver(s) 32 radio signal quality measurements and possibly scanned broadcast information from served radio terminals as well as radio terminals initiating access in a cell selection procedure for use in handover and cell selection operations as well as in generating neighbor cell relation lists. A neighbor cell relation list is stored in a memory 40. The base station communicates with other network entities via one or more interfaces 42.

Authorization of radio terminals is based on signaling via interface 42. Furthermore, the discovery of a new neighbor cell is followed by communication over interface 42 in order to establish connectivity information to the base station serving the new cell, as well as other information about the cell, e.g. cell type. When a candidate cell is reported, the cell reporting processor 38 may continue to monitor the candidate cell by receiving measurements from the transceiver 32. The measurements associated to the candidate cell are sent to a handover processor 43, which determines whether and when a handover is considered beneficial. When the handover processor 43 has determined to proceed with a handover, the handover procedure is performed via signaling with the radio terminal using the transceiver 32, with the next serving base station via one of the interfaces 42, and to a core network node via one of the interfaces 42.

Figure 5:
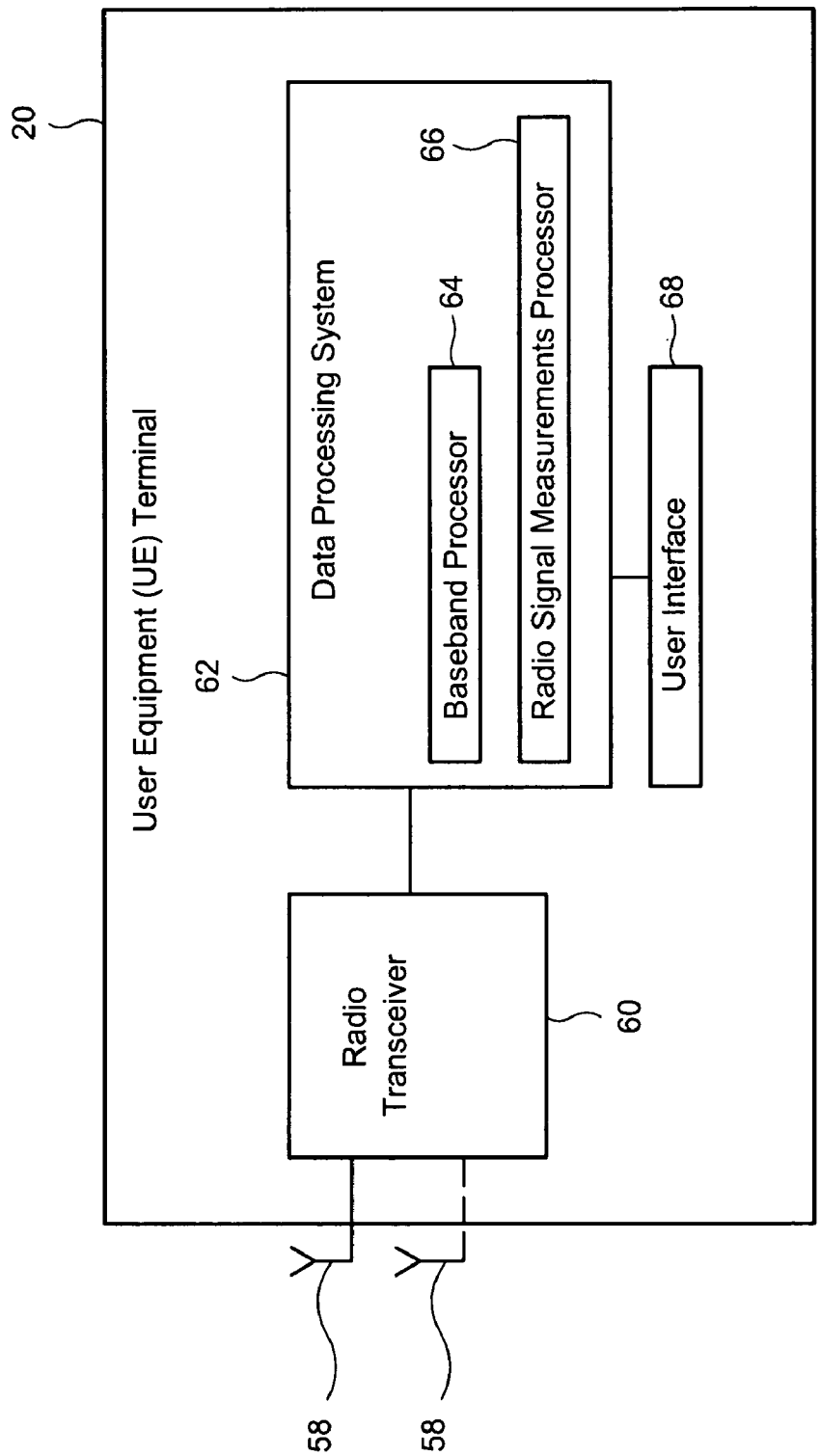
FIG. 5 is a non-limiting, example function block diagram of a radio terminal.

FIG. 5 is a non-limiting, example function block diagram of a radio terminal. The radio terminal 20 includes a radio transceiver 60 coupled to one or more antennas 58 for communicating over the radio interface with base stations. The radio transceiver 60 connects to a data processing system 62 that includes a baseband processor 64 that performs baseband processing on the information to be transmitted via the radio transceiver 60 and on signals received from the radio transceiver 60. The data processing system 62 also includes a radio signal measurements processor 66 that controls the transceiver 60 to measure and possibly filter radio signal quality and possibly scan broadcast signals and information contained in those signals from neighboring base stations including CSG base stations and perform measurement report triggering by evaluating criterions configured by the serving base station. When a triggering condition is met, the measurement processor sends measurement reports to a serving base station. As explained above, in the measurement report triggering the measurements processor 66 considers all cells except CSG cells that are restricted and that the serving base station has not instructed the radio terminal to specifically consider, even though they are restricted. The radio terminal 20 also includes a user interface to permit a user to program the radio terminal and communicate with the radio terminal.

Figure 6:
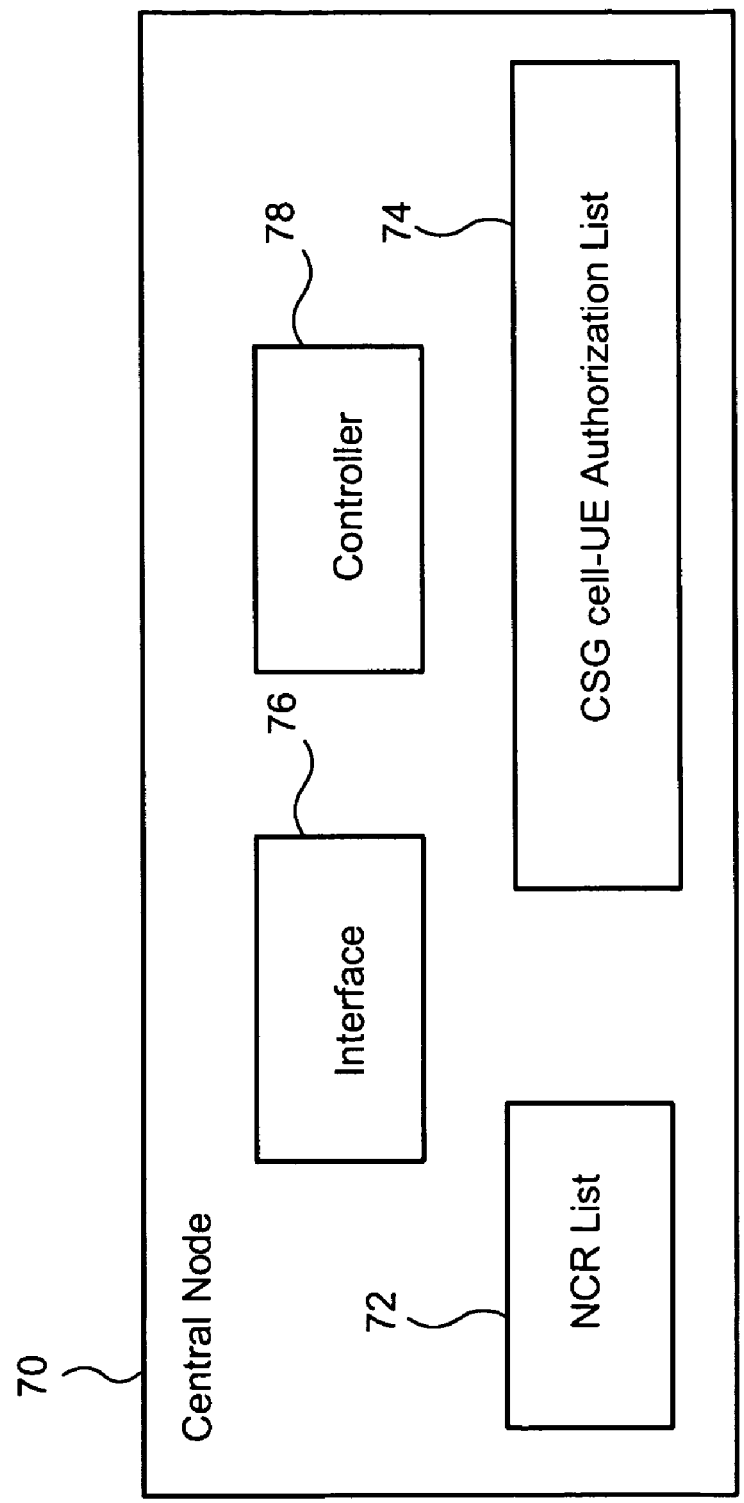
FIG. 6 is a non-limiting, example function block diagram of a central node storing cell lists.

FIG. 6 is a non-limiting, example function block diagram of a central node 70. The central node 70 includes a controller 78 for performing supervisory, data processing, and control functions and communicates with other network nodes via an appropriate interface 76. A memory such as a database is provided for storing a CSG cell-radio terminal authorization list 74 and optionally neighbor cell relation lists 72 for various cells in the network and other lists. The CSG cell-radio terminal authorization list 74 is updated via the interface 76, possibly by synchronizing the list with information in another central node. A radio terminal's identifier (e.g., IMSI) may be added/replaced/removed from the CSG cell-radio terminal authorization list 74 either by the network operator or by the owner of the CSG base station. This can be done for example via an operator web interface using phone numbers as identifiers which then are converted to radio terminal IMSIs. The neighbor cell relation list of a one cell can be synchronized with the base station serving the one cell.

Figure 7:
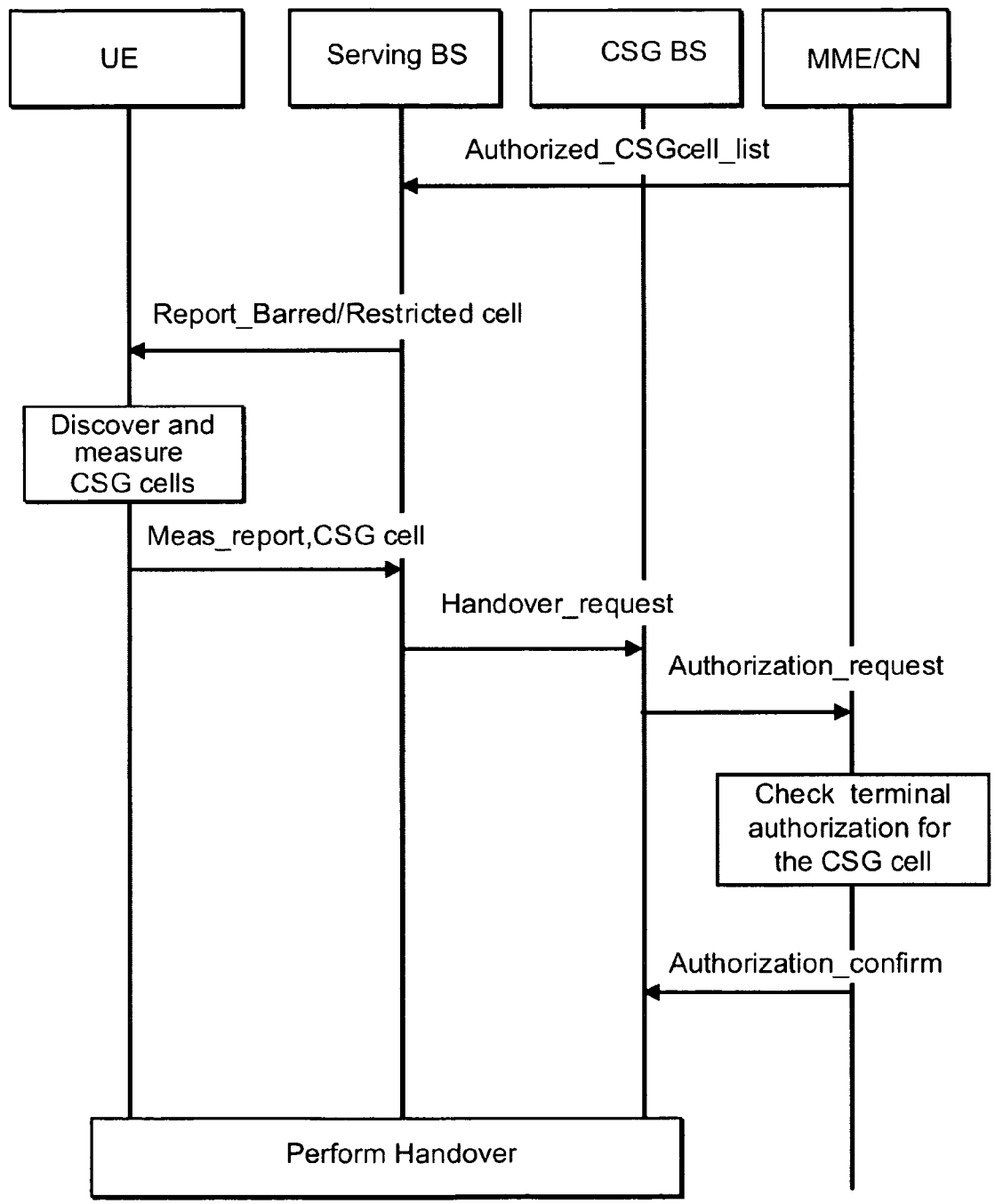
FIG. 7 is signaling diagram illustrating non-limiting, example signaling procedures for CSG cell handling to support handover to CSG base stations.

FIG. 7 is signaling diagram illustrating non-limiting, example signaling procedures for CSG cell handling to support base station-to-CSG base station handover assuming a non-limiting example the LTE architecture. FIG. 9 helps illustrate the example in FIG. 7. The central node (for LTE this can be the MME) sends an Authorized_CSGcell_list message to the serving base station to inform the serving base station of authorized CSG cells for a particular radio terminal being served by that base station. This signaling is denoted 'A' in the example in FIG. 8. The serving base station sends a measurement control signal, e.g., Report_Barred/Restricted/CSG cell including a list or a range of cell identifiers of authorized CSG cells, to the particular radio terminal instructing the radio terminal to consider the set of CSG cells in the measurement report triggering even though those CSG cells are barred or restricted or are included in a black list generally broadcast by the serving base station over the serving cell's broadcast channel. This signaling is denoted 'B' in the example in FIG. 9. The radio terminal complies with this instruction, and while being served by the same base station and if a measurement report triggering condition that involve any of the listed CSG cells is met, the radio terminal sends a measurement report Meas_report CSG cell to the serving base station including the cell identity of the triggering cell. The measurement report triggering mechanism itself is the same for all cells, but only authorized cells are considered in the measurement report triggering mechanism. All handover candidate cells considered in the measurement report triggering are cells that the radio terminal is authorized to access and obtain service from.

Figure 8:
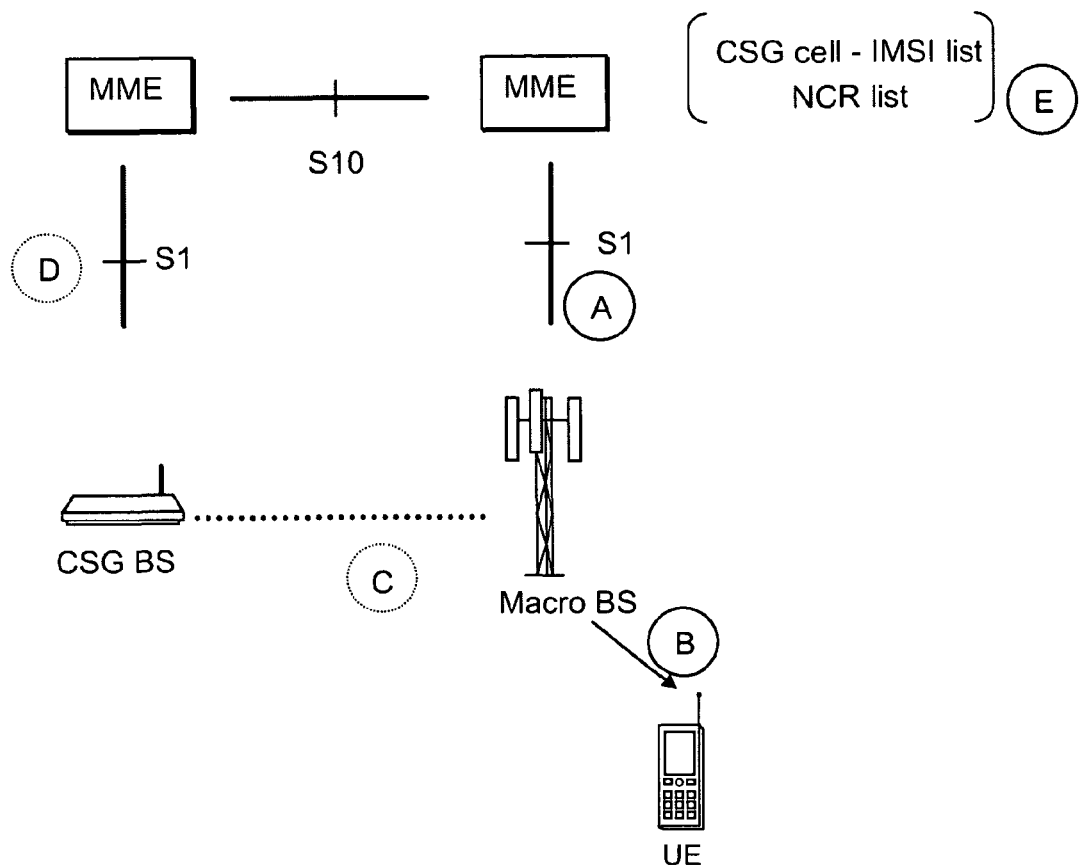
FIG. 8 illustrates the example in FIG. 7 in different way.

If the serving base station decides, possibly after the reception of subsequent measurement reports related to the triggering cell, that the radio terminal connection should be handed over to the reported CSG cell, the serving base station sends a Handover_request message to the CSG base station logically via 'C' in FIG. 8, possibly via multiple interfaces and nodes (via the central node/MME in the LTE architecture) as is illustrated by FIG. 8. The MME/CN checks its CSG cell-radio terminal authorization list 74 and determines that the radio terminal is an authorized member of the CSG for this cell. A handover Authorization_confirm message is sent to the CSG base station via 'D' in the example in FIG. 8 and the serving base station, possibly via multiple interfaces and nodes as is illustrated by FIG. 8, and the handover to the CSG cell is performed.

Large closed subscriber group networks may present additional issues. Consider a radio terminal authorized to access a large CSG network consisting of many CSG cells. Each time the radio terminal performs a handover to a new serving base station, that serving base station will receive a list from the central node/MME/HSS including the cell identifiers (e.g., CGIs) of all CSG cells for which the radio terminal is authorized to access. That list may be quite long, making the communication between the serving base station and the MME costly in terms of communications resources.

To solve this problem, a CSG network may use a defined cell identifier (e.g., CGI or PCI) range. All cells with a cell ID (e.g., CGI or PCI) in the range are assumed to belong to the CSG network. In order for the MME to inform the serving macro base station that a radio terminal is authorized in all CSGs belonging to a certain network it only needs to communicate the cell ID (e.g., CGI or PCI) range of the CSG network. The serving base station may then simply check if a CSG neighbor cell has a cell ID (e.g., CGI or PCI) within the range in order to determine if the corresponding radio terminal is authorized in that CSG cell. This limits the amount of signaling required between the central node/MME and the serving base station.

If desired, the operator may charge the CSG network owner for the service of providing the cell ID range. Private users or small companies may use a small cell ID range associated with a small cost, while larger companies or organizations may use a larger cell ID range for which the operator may charge more. The service is meritorious because the CSG owner does not need to explicitly authorize every radio terminal in every CSG cell. Once a radio terminal is authorized to access the CSG network it is automatically authorized in every cell belonging to the CSG network.

Furthermore, the cell ID range may be used if desired in lieu of individually directed measurement control signals between the serving base station and individual radio terminals. The radio terminals may simply be requested to consider all cells belonging to the cell ID range in the measurement report triggering even though those cells might include one or more restricted/barred/CSG cells, or are included in the "black list" of the serving cell. This approach is particularly useful when the number of CSG cells is large and belongs to the same operator. Moreover, the cell ID range could be used to compile a "black list" dedicated for an individual radio terminal that replaces the black list that is broadcast by the serving base station over the serving cell's broadcast channel.

At a radio terminal handover, there may be information exchange between the new serving cell and a central node/MME/HSS. This information includes the list of CSG cells the radio terminal has access to. For most cells in the network, the CSG cell-radio terminal authorization information is not relevant because those cells are not neighbors to any cell in the CSG cell authorization list. In that case, the CSG cell authorization information is not needed in the serving base station. Consider the illustrative example situation where the radio terminal owner has a CSG cell installed at home and that user is now visiting another city. In that case, the cell that the radio terminal performs a handover to will not be a neighbor to the radio terminals home CSG cell.

It is therefore desirable to filter the CSG authorization list signaled from the central node/MME to the coupled serving base station to only include the CSG cells that also belongs to the serving cell's neighbor cell. One preferred but still example way to do this is to store the NCR lists of all cells served by base stations coupled to a particular central node/MME. Then, the central node can compare the serving cell's neighbor cell relation list to the CSG cell-radio terminal authorization list for the considered radio terminal. This produces relatively little signaling at handover events at the cost of synchronization of neighbor cell relation lists between the central node/MME and the base stations. Another way to do this is to only store a base station's NCR list in the base station and not in the central node/MME, and signal the neighbor cell relation list to the central node/MME after every handover. The filtering again takes place in the central node. This approach does require significant signaling from the new serving cell and the central node/MME.

Several other solutions are possible in order to filter the CSG authorization list signaled between the central node/MME and the macro base station. The CSG authorization list may be filtered based on tracking areas. The central node/MME knows the tracking area of the CSG cells that the radio terminal is authorized to access. When the MME is contacted about a new radio terminal entering the cell of a base station, the MME checks if any authorized CSG cell belongs to the same tracking area as that serving base station. Only authorized CSG cells that also belong to the same tracking area as the serving cell are included in the CSG authorization list that is sent to the serving base station from the central node/MME. The CSG authorization list may also be filtered based on PLMN Identity. The MME knows the PLMN identity for the CSG cell(s) that a radio terminal is authorized to access. When the MME is contacted about a new radio terminal entering the cell of a base station, the MME checks if any authorized CSG cells belongs to a PLMN that is compatible with the PLMN identity of the serving base station. The term compatible as used to include situations where an operator has several different PLMN identities or where several operators with different PLMN identities own a network together. Only authorized CSG cells that also belong to a compatible PLMN to the serving base station are included in the CSG authorization list that is sent to the serving base station from the central node/MME.

At a radio terminal handover, there may be information exchanged between the old serving cell and the new serving cell. This information may include the authorization list of CSG cells the radio terminal has access to. With such signaling support, only the base station where the radio terminal originally registers needs to contact the central node, e.g., the HSS or the visitor location register (VLR), and obtain the authorization list of CSG cell(s) the radio terminal has access to. This authorization list of CSG cell(s) the radio terminal has access to is then passed on to the next serving base station as part of the radio terminal handover process.

The advantages of the technology described above include the cost-efficient support for handover from a general cell to a CSG cell, while supporting a flexible CSG management where radio terminals can be added and removed with ease from the authorization lists of each CSG cell. Furthermore, the use of cell identity ranges makes the solution scalable to networks of CSG cells, and if black lists are used, the effort to determine that a cell is forbidden for access is small.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method relating to handover of a radio terminal connection from a serving base station associated with a serving cell to a closed subscriber group (CSG) cell served by a CSG base station, where only a radio terminal belonging to the CSG, as indicated by a radio terminal identifier qualifying the radio terminal as an authorized subscriber to the CSG, is permitted to access and receive service from the CSG cell, and where information is provided to radio terminals in the serving cell that identifies radio terminals that are not to report to the serving base station signal quality measurements of signals transmitted by the CSG base station, the method implemented in the serving base station comprising:
   determining that one of the radio terminals in the serving cell is authorized to access and receive service from the CSG cell;
   sending a message to the one radio terminal indicating that the CSG cell may be considered as a handover candidate for the radio terminal;
   based on a signal quality measurement report corresponding to the CSG base station, determining that a connection with the one radio terminal may be handed over to the CSG base station; and
   facilitating handover of the connection to the CSG base station,
   wherein radio terminals are informed not to report to the serving base station signal quality measurements of signals transmitted by the CSG base station using a first message that indicates that the CSG cell is a forbidden cell, and
   wherein the sending step includes sending a second subsequent message to the one radio terminal indicating that the one radio terminal should report signal quality measurements of signals transmitted by the CSG base station.

2. The method in claim 1, wherein the information not to report to the serving base station signal quality measurements of signals transmitted by the CSG base station is broadcast in the serving cell and includes a list identifying cells for which the information is not to be reported or a list of cells identifying only those cells for which the information is to be reported.

3. The method in claim 2, further comprising:
   broadcasting a modified cell list in the serving cell to modify those cells for which the information is not to be reported.

4. The method in claim 1, wherein the first message that indicates that the CSG cell is a forbidden cell contains the information that the cell is barred, restricted, or a CSG cell.

5. The method in claim 1, wherein the first message is transmitted by the serving base station or by the CSG base station.

6. The method in claim 1, wherein the determining includes receiving an authorization list of CSG cells from a central node coupled to the serving base station indicating that the one radio terminal is authorized to access and obtain service from the CSG cell.

7. The method in claim 6, wherein the authorization list is filtered in the central node to only include the CSG cells that are possible handover candidates for the one radio terminal considering the location of the one radio terminal.

8. The method in claim 1, wherein:
   the CSG cell is part of a CSG network of CSG cells to which the radio terminal is authorized to access and request service, each of the CSG network cells having an associated cell identifier, and
   the determining includes receiving a CSG cell identifier range from a central node coupled to the serving base station.

9. The method in claim 8, further comprising:
   signaling the one radio terminal to report measurement information for one or more handover candidate CSG cells that broadcast a cell identifier in the CSG cell identifier range.

10. A serving base station for assisting in handover of a radio terminal connection from the serving base station associated with a serving cell to a closed subscriber group (CSG) cell served by a CSG base station, where only a radio terminal belonging to the CSG, as indicated by a radio terminal identifier qualifying the radio terminal as an authorized subscriber to the CSG, is permitted to access and receive service from the CSG cell, and where information is provided to radio terminals in the serving cell that identify radio terminals that are not to report to the serving base station signal quality measurements of signals transmitted by the CSG base station, the serving base station comprising:
   radio transceiving circuitry, and
   a data processing system including electronic circuitry configured to:
      determine that one of the radio terminals in the serving cell is authorized to access and receive service from the CSG cell;
      send a message to the one radio terminal indicating that the CSG cell may be considered as a handover candidate for the radio terminal;
      based on a signal quality measurement report for the CSG base station, determine that a connection with the one radio terminal may be handed over to the CSG base station; and
      facilitate handover of the connection to the CSG base station,
   wherein radio terminals have been informed not to report to the serving base station signal quality measurements of signals transmitted by the CSG base station using a first message that indicates that the CSG cell is forbidden for general access, and wherein the electronic circuitry is configured to generate a second subsequent message to be transmitted via the radio transceiving circuitry to the one radio terminal indicating that the one radio terminal should report signal quality measurements of signals transmitted by the CSG base station.

11. A serving base station for assisting in handover of a radio terminal connection from the serving base station associated with a serving cell to a closed subscriber group (CSG) cell served by a CSG base station, where only a radio terminal belonging to the CSG, as indicated by a radio terminal identifier qualifying the radio terminal as an authorized subscriber to the CSG, is permitted to access and receive service from the CSG cell, and where information is provided to radio terminals in the serving cell that identify radio terminals that are not to report to the serving base station signal quality measurements of signals transmitted by the CSG base station, the serving base station comprising:
   radio transceiving circuitry, and
   a data processing system including electronic circuitry configured to:
      determine that one of the radio terminals in the serving cell is authorized to access and receive service from the CSG cell;

send a message to the one radio terminal indicating that the CSG cell may be considered as a handover candidate for the radio terminal;

based on a signal quality measurement report for the CSG base station, determine that a connection with the one radio terminal may be handed over to the CSG base station; and facilitate handover of the connection to the CSG base station, wherein the radio transceiving circuitry broadcasts information not to report to the serving base station signal quality measurements of signals transmitted by the CSG base station in the serving cell and includes a list identifying cells for which the information is not to be reported or a list of cells identifying only those cells for which the information is to be reported, and wherein the radio transceiving circuitry is configured to broadcast a modified cell list in the serving cell to modify those cells for which the information is not to be reported.

12. The serving base station in claim 10, where the message indicating that the CSG cell is forbidden includes that the cell is a barred cell, a restricted cell, or a CSG cell.

13. The serving base station in claim 10, wherein the electronic circuitry is configured to receive an authorization list of CSG cells from a central node coupled to the serving base station indicating that the one radio terminal is authorized to access and obtain service from the CSG cell.

14. The serving base station in claim 13, wherein the electronic circuitry is configured to compare the authorization list of CSG cells to the neighbor cell relation list of the serving cell and to compile a new authorization list of CSG cells in the serving cell's neighbor cell relation list.

15. The serving base station in claim 14, wherein the electronic circuitry is configured to send the serving cell's neighbor cell relation list to the central node prior to receiving the authorization list of CSG cells.

16. The serving base station in claim 10, wherein:
the CSG cell is part of a CSG network of CSG cells to which the one radio terminal is authorized to access and request service, each of the CSG network cells having an associated cell identifier, and
the electronic circuitry is configured to receive a CSG cell identifier range from a central node coupled to the serving base station and to check whether the one radio terminal's cell identifier is in the received CSG cell identifier range, and if so, to authorize the one radio terminal to access and receive service from any of the CSG cells in the CSG network.

17. The serving base station in claim 16, wherein the radio transceiving circuitry is configured to signal the one radio terminal to report measurement information for one or more CSG cells that broadcast a cell identifier in the CSG cell identifier range.

18. The serving base station in claim 10, wherein the electronic circuitry is configured to receive an authorization list of CSG cells during handover from a previous serving base station for the radio terminal, and wherein the authorization list of CSG cells indicates that the one radio terminal is authorized to access and obtain service from the CSG cell.

19. The serving base station in claim 10, wherein the electronic circuitry is configured to receive an authorization list of CSG cells from a central node when the one radio terminal accesses the radio network at the serving base station, and wherein the authorization list of CSG cells indicates that the one radio terminal is authorized to access and obtain service from the CSG cell.

20. A radio terminal for communicating with a serving base station associated with a serving cell, where the radio terminal belongs to a closed subscriber group (CSG) cell served by a CSG base station, and where only a radio terminal belonging to the CSG, as indicated by a radio terminal identifier qualifying the radio terminal as an authorized subscriber to the CSG, is permitted to access and receive service from the CSG cell, comprising:

radio transceiving circuitry, and
a data processing system coupled to the radio transceiving circuitry including electronic circuitry configured to:
receive first information informing the radio terminal not to report to the serving base station signal quality measurements of signals transmitted by CSG base stations;
obtain a measure of quality of signals transmitted by neighboring base stations other than CSG base stations and report those signal quality measurements to the serving base station for a possible handover operation;
receive second information overriding the first information and informing the radio terminal to report to the serving base station signal quality measurements of signals transmitted by the CSG base station; and
measure a signal quality of a signal transmitted by the CSG base station and report the CSG base station signal quality measurement to the serving base station.

21. The radio terminal in claim 20, wherein when the radio terminal receives instructions to handover to the CSG base station, the electronic circuitry is configured to instruct the radio transceiving circuitry to establish communications with the CSG base station.

22. The radio terminal in claim 20, wherein the second information includes a range of CSG cell identifiers, the electronic circuitry is configured to measure a signal quality of a signal received by any CSG base station having a cell identifier in the range and report those CSG base station signal quality measurements to the serving base station.

23. The radio terminal in claim 20, wherein if the radio terminal is unable to obtain or maintain service from a serving base station, the electronic circuitry is configured to scan a signal quality of a signal received by any nearby CSG base station and to select a nearby CSG base station to provide service, wherein an authorized CSG base station has a higher selection priority than an unauthorized CSG base station.

24. A central node, comprising:
an interface for communicating with a serving base station serving a serving cell and with a closed subscriber group (CSG) base station serving a CSG cell in which only a radio terminal belonging to the CSG, as indicated by a radio terminal identifier qualifying the radio terminal as an authorized subscriber to the CSG, is permitted to access and receive service from the CSG cell;
a memory for storing a CSG authorization list which for each of multiple radio terminals identifies all CSG cells that the radio terminal is authorized to access and receive service from; and
a controller configured to provide a CSG authorization list to the serving base station serving a radio terminal in the serving cell when the CSG authorization list includes CSG cells which the radio terminal is authorized to access, and to otherwise not provide the CSG authorization list to the serving base station,
wherein the controller is further configured to determine a CSG PLMN identity associated with one or more CSG cells that the radio terminal is authorized to access, and when the central node is notified that the radio terminal has accessed the serving cell, to check whether the CSG PLMN identity corresponds to a compatible PLMN identity associated with the serving cell, and if so, to inform the serving base station about the one or more CSG cells.

25. The central node in claim 24, wherein the controller is configured to only include CSG cells in the CSG authorization list that are neighbors to the serving cell and that the radio terminal is authorized to access.

26. The central node in claim 25, wherein the memory stores a neighbor cell relations (NCR) list for the serving cell and the controller uses the NCR list to determine whether a CSG cell is a neighboring cell.

27. The central node in claim 25, wherein the central node is configured to receive a neighbor cell relations (NCR) list for the serving cell from the serving base station, and the controller is configured to use the NCR list to determine whether a CSG cell is a neighboring cell to a serving cell.

28. The central node in claim 24, wherein the controller is configured to permit modifications to the CSG authorization list.

29. The central node in claim 24, wherein the CSG cell is part of a CSG network of CSG cells to which the radio terminal is authorized to access and request service, each of the CSG network cells having an associated cell identifier, and wherein the controller is configured to determine a CSG cell identifier range for the CSG network and provide the CSG cell identifier range to the serving base station.

30. The central node in claim 24, wherein the controller is configured to determine a CSG tracking area associated with one or more CSG cells that the radio terminal is authorize to access, and when the central node is notified that the radio terminal has accessed the serving cell, to check whether the CSG tracking area corresponds to a tracking area of the serving cell, and if so, to inform the serving base station about the one or more CSG cells.

* * * * *

UNITED STATES PATENT AND TRADEMARK OFFICE
CERTIFICATE OF CORRECTION

PATENT NO. : 8,265,033 B2
APPLICATION NO. : 12/153797
DATED : September 11, 2012
INVENTOR(S) : Gunnarsson et al.

Page 1 of 1

It is certified that error appears in the above-identified patent and that said Letters Patent is hereby corrected as shown below:

On Title Page, item (73), under "Assignee", in Column 1, Line 1,
delete "Telefonakatiebolaget" and insert -- Telefonaktiebolaget --, therefor.

On Page 2, item (56), under "OTHER PUBLICATIONS", in Column 2, Line 2,
delete "Unformation;" and insert -- Information; --, therefor.

In Column 4, Line 23, delete "CSC" and insert -- CSG --, therefor.

Signed and Sealed this
Twelfth Day of February, 2013

Teresa Stanek Rea
*Acting Director of the United States Patent and Trademark Office*